May 22, 1956 R. BROWN ET AL 2,746,240
PUMP AND MOTOR HYDRAULIC TRANSMISSION AND PRESSURE
RESPONSIVE SERVO-MOTOR CONTROL MEANS
FOR THE PRIME MOVER THEREOF
Filed Oct. 19, 1950 3 Sheets-Sheet 1

INVENTORS
Robert Brown
Thomas Edwards
BY
*signature*
his ATTORNEY

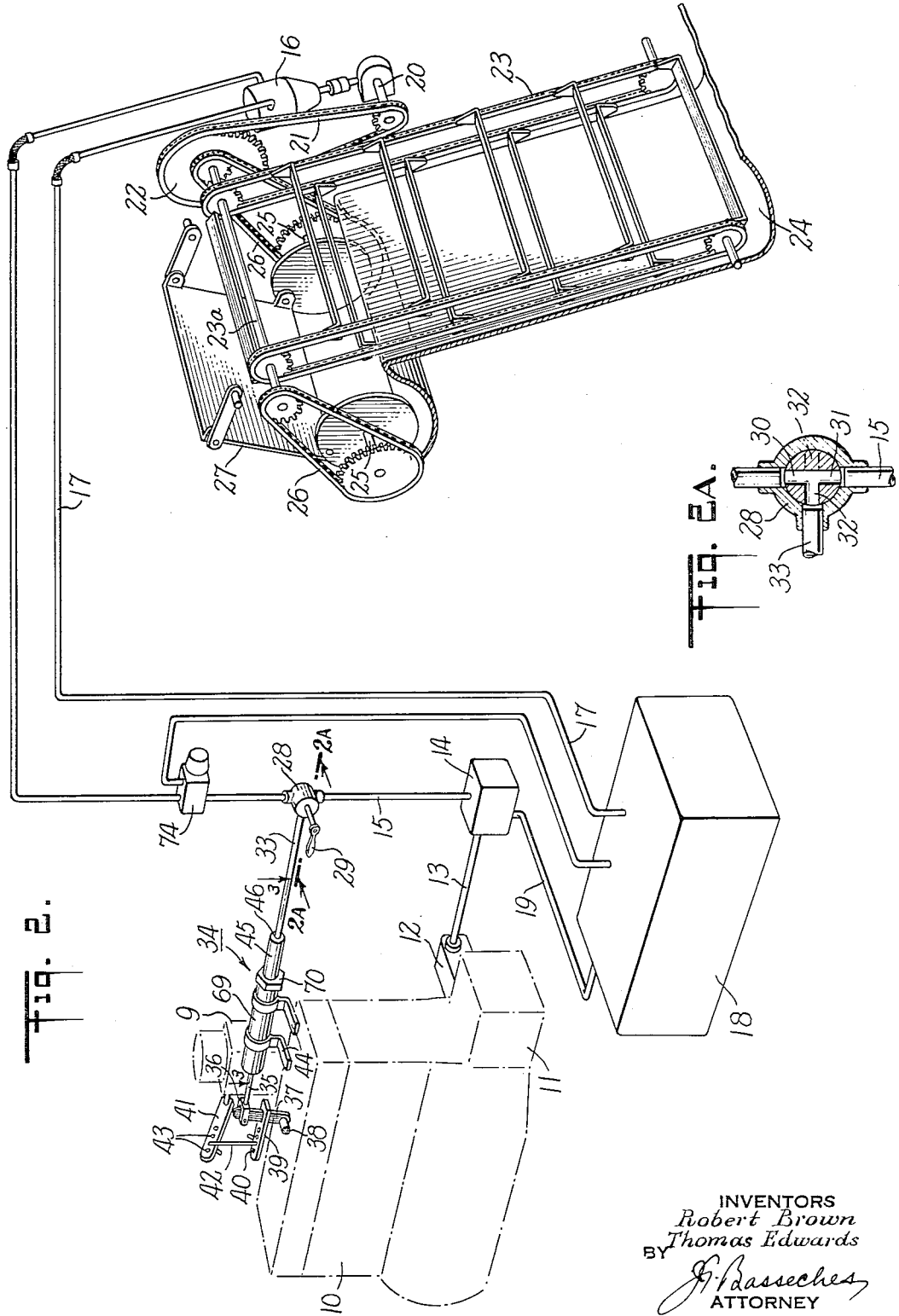

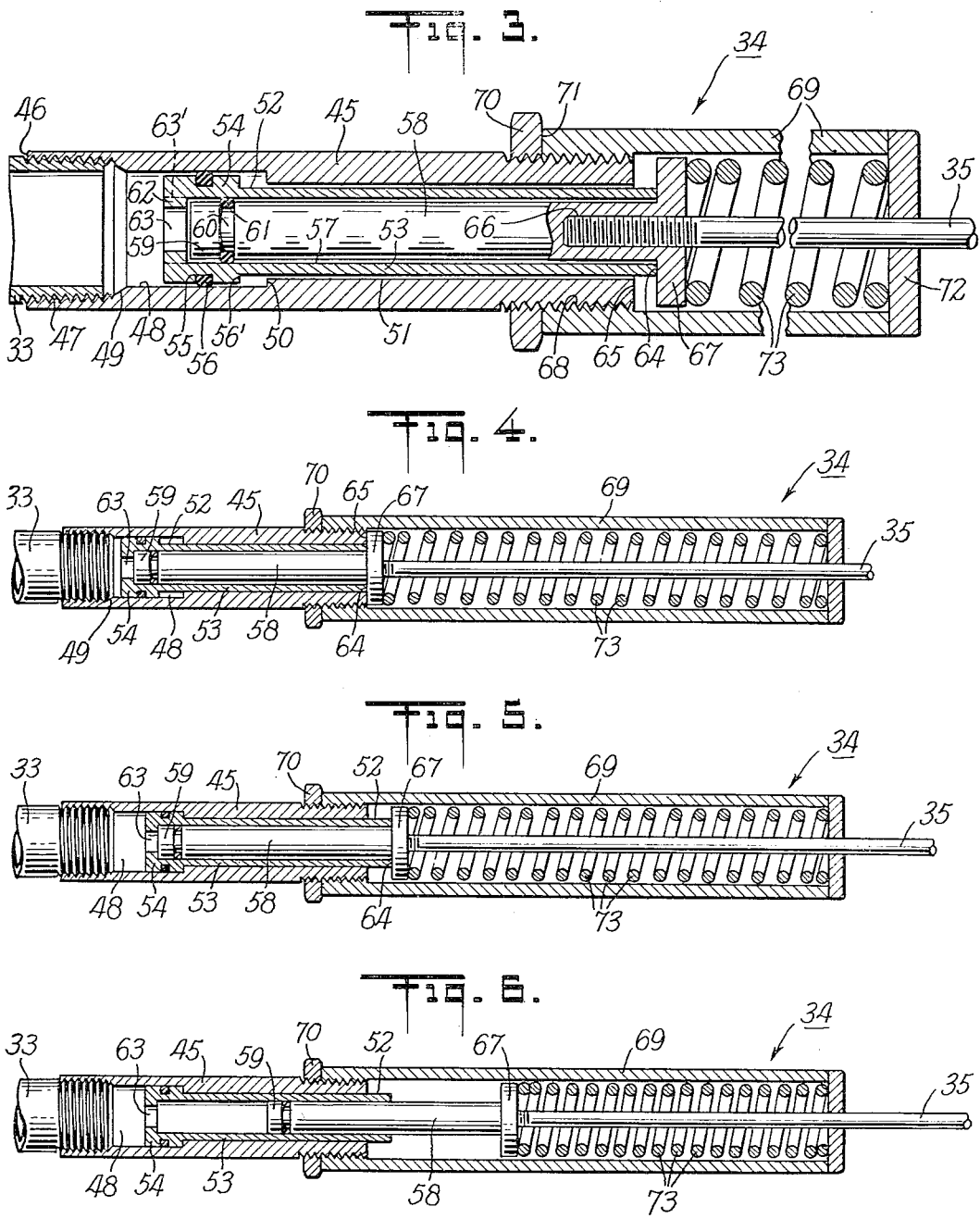

United States Patent Office 2,746,240
Patented May 22, 1956

2,746,240

PUMP AND MOTOR HYDRAULIC TRANSMISSION AND PRESSURE RESPONSIVE SERVO-MOTOR CONTROL MEANS FOR THE PRIME MOVER THEREOF

Robert Brown, Hartsdale, and Thomas Edwards, Sunnyside, N. Y., assignors to City Tank Corporation, Corona, N. Y., a corporation of New York Application October 19, 1950, Serial No. 190,964

5 Claims. (Cl. 60—19)

This invention relates to refuse truck assemblies and more particularly to a servo-motor construction for controlling the throttle of the fuel motor operating an hydraulic pump for a refuse truck loader.

Our invention has for its object the provision of operating equipment for loading a refuse collecting truck wherein the fuel fed motor for propelling the truck includes a power take-off transmission driving an hydraulic pump which feeds liquid to an hydraulic motor for the refuse truck loader, and includes a servo-motor in the hydraulic pressure line which will control the fuel fed to the fuel motor in accordance with operating conditions encountered in the loader to stabilize the operation thereof.

Known to us is the provision in the hydraulic power transmission systems for mechanically propelled vehicles, tractors and the like of throttle control for the engine by the employment of a servo-motor in the hydraulic line which responds to gradual variance in the load of the traction mechanism to vary the fuel supply. These devices are ordinarily under constant manual supervision so that the abnormal variance which may be encountered by the torque converting hydraulic system may be quickly remedied.

Vehicles which employ hydraulic torque conversion systems under the momentum of rolling seldom experience abrupt operating conditions. Accordingly the provision of hydraulic servo-motors for throttle control for fuel motors is not considered desirable unless there is a constant manual supervision of the fuel and a freedom from abrupt changes in operating loads.

Where we have attempted to use hydraulic servo-motors for throttle control of the engine driving refuse loaders and packers through a power take-off transmission, operating the loader or packer by hydraulic motor, in which there is no operator in constant attendance for the throttle, we have found that conditions of operation of the engine at idling speeds and normal load speeds employing available servo-motors in the hydraulic line has resulted in extreme instability. This instability may be explained by a self-energizing of the hydraulic pressure at idling and normal conditions of operation and a building up of pressure at unusual loads to actuate a relief valve in the hydraulic line. The use of such servo-motors for operating the throttle of a refuse loader and packer encountering intermittent loads and abrupt changes in condition is not only unstable but uneconomical in fuel consumption and requires an attendant at the throttle at all times.

We have found and it is an object of our invention to provide a stabilizing control for the engine or truck motor which operates an hydraulic pump serving the hydraulic motor of a refuse loader and packer equipment. It is an object of our invention to provide in a refuse loader assembly as described, a servo-motor responsive to varied changes in pressure of the hydraulic line to control the throttle or fuel of the truck motor which results in an economical fuel consumption and eliminates the necessity for an attendant at the throttle at all times, such as during idling conditions, normal loads and abrupt loading conditions such as would ordinarily actuate the relief valve and stall and loading and packing equipment.

It is an object of our invention to provide in an assembly of the character described, a servo-motor for operating and controlling the throttle or fuel to the truck engine, which is responsive to control of the engine at idling and normal operating speeds, will not be self-energizing to race the engine or become unstable but will respond to abrupt load conditions to speed up the engine, to take care of the abrupt loads.

Still more particularly it is an object of this invention to provide a novel servo-motor construction operating in the hydraulic line of an installation as described which is responsive to gradient changes in load for economical fuel consumption and is stable under such normal conditions of operation, yet responds to abrupt load conditions which the loader or packer may encounter.

To attain these objects and such further objects as may appear herein or be hereinafter pointed out, we make reference to the accompanying drawing, forming a part hereof, in which—

Figure 2 is a perspective view of the same, showing the parts in greater detail;

Figure 3 is a magnified longitudinal fragmentary sectional view taken on the line 3—3 of Figure 2;

Figures 4, 5 and 6 are views similar to Figure 3 showing the position of the servo-motor at idling, normal and abnormal load conditions.

Figure 2A is a section taken on the line 2A—2A of Figure 2.

Figure 1:
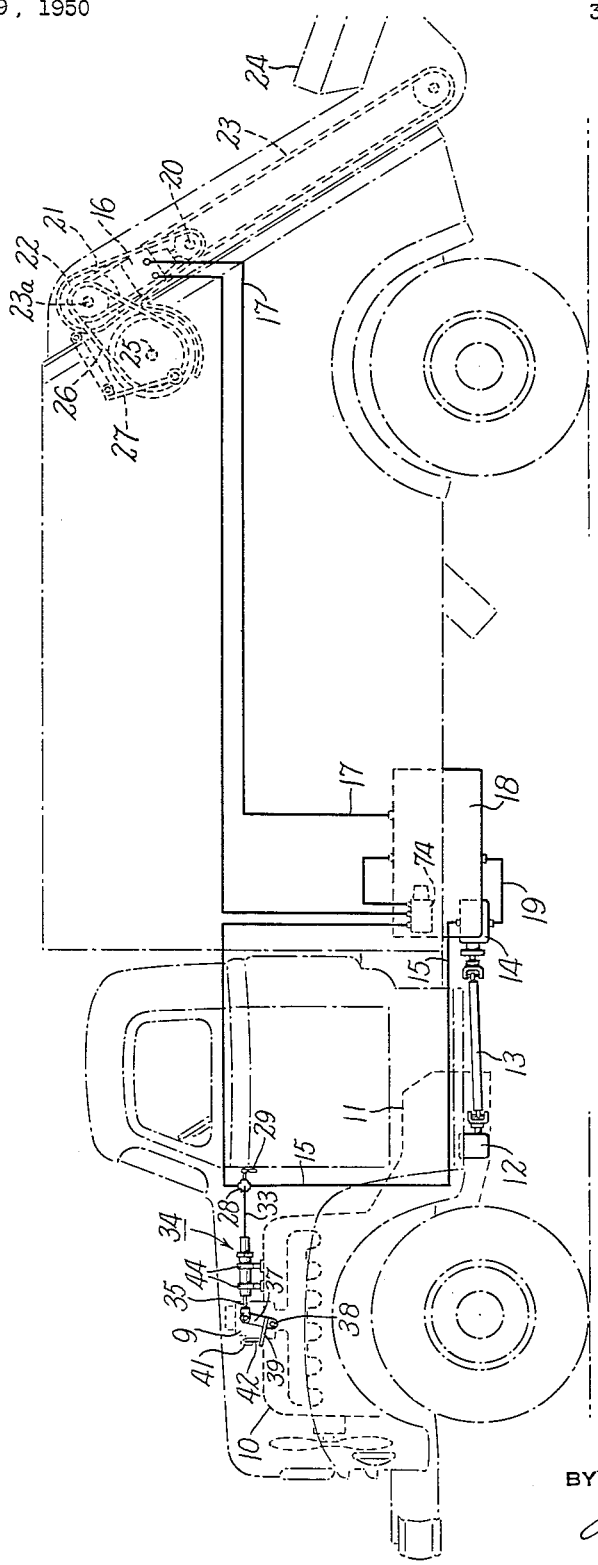
Figure 1 is a diagrammatic side view illustration of the assembly as applied in a refuse loader truck installation.

Summarizing our invention, we provide a refuse truck assembly having a refuse loader or packer which is driven by an hydraulic motor pressurized by an hydraulic pump which is driven by the truck engine through a power take-off unit in which an hydraulic servo-motor responds to the pressure in the hydraulic line to control the feed of the fuel to the truck engine, characterized by a servo-motor which is stable under idling and normal load operating conditions without self-energizing beyond economical operating conditions but which responds to abrupt changes in load to meet sudden abnormal conditions of load which may be imposed upon the hydraulic motor; and further characterized by a spring loaded hydraulic servo-motor having a pair of pressure responsive pistons, each responsive to gradient changes but one becoming operative within a normal load range and the other becoming operative independently at suddenly encountered abnormally high loads.

Referring to the drawing, there is diagrammatically illustrated an engine block 10 to be found on trucks such as refuse collecting trucks of the gasoline type or Diesel type, which is throttle controlled in the usual way and has a transmission 11 to which is coupled a power take-off 12. The power take-off unit, through the shaft 13, drives an hydraulic pump 14 which, through the power line 15, drives the hydraulic motor 16. A return line 17 runs to the reservoir 18 from which oil may be fed to the pump 14 by the line 19.

The motor 16 drives the counter shaft 20 which, in turn, through the chain drive 21, is coupled to the gear 22, operating a uniformly rotating chain lift 23, mounted on the shaft 23a so that the lift deposits the refuse through an opening in the tailgate above the truck floor from a pick-up position leading into the loading hopper 24.

Counter shafts 25 are driven by the chain belt 26. The counter shafts 25 are coupled with an intermittently effective blade packer 27. The installation of lift and packer exemplified herein is more particularly described and claimed in the application of John P. Calamore, Serial No. 126,496, filed November 10, 1949, now Patent No. 2,660,326 of November 24, 1953.

In accordance with operating conditions encountered in use of the refuse loader and packer, the refuse truck is moved along the road by the engine 19 until refuse is loaded. For this operation, the engine is throttled down to idling speeds for shifting the transmission without clashing the gears, to engage the power take-off unit. Idling engine speeds may vary but economically, for certain engines, idling speeds of 350 to 425 revolutions per minute may be employed without gear clashing. When the power take-off unit is engaged, the engine is manually accelerated to a speed economical for moving the lift and packer mechanism free of any load condition. The range of engine speed previously recited takes care of the friction of the load of maintaining the uniform rotation for operating the lifts and the intermittent pushing of the loader or packer coupled therewith. Nonetheless, the added pressure built up in the hydraulic line does not interfere with an operation of the engine at economical throttle speeds. Increased oil flow through the motor 16 to meet the burden of loading and packing is met by increasing the revolution speed of the engine driving pump 14. For normal loading of refuse, an engine speed of from 600 to 650 revolutions per minute with conventional refuse collecting truck installations provides an economical engine operation and satisfactory power of the loader and packer. As the demand for power increases, depending upon the volume of loading, the power absorbed in fluid slippage is compensated by a greater speed of hydraulic fluid circulation and engine speeds from 600 to 650 revolutions per minute with the installation described may be required.

As relatively infrangible refuse is loaded into the hopper, greater resistance is encountered by the packer by reason of the accumulation of refuse in the truck body, and a condition may suddenly develop where a crank shaft speed of from 1000 to 1250 revolutions per minute is necessary to prevent stalling, and oil pressure in the line is built up from 60 to 200 pounds, ranging from idling speeds to normal load speeds on the one hand with crankshaft speeds of 375 to 675 revolutions per minute, suddenly to a back pressure close to operation of the relief valve of about 800 pounds per square inch.

The foregoing conditions reflect themselves on the carburetor setting of the engine and make for great instability, requiring constant attendance and a shift in the setting of the carburetor to meet the varying conditions or to maintain an abnormally high engine idling speed which makes for uneconomical fuel consumption as well as for a harmful condition of operation. This condition is occasioned by the fact that the hydraulic system tends in accordance with our explanation to become self-energizing requiring progressively a pick-up speeding of the engine or to result in a stalling if not attended to prevent such stalling.

One would suppose that for the stabilization of the foregoing operating conditions, a hand control on the dashboard with a connection by means of a connecting rod to the carburetor, and by means of some supervision and attendance of a driver, would ordinarily serve to correct for variations in conditions. This is not the case for reasons explained with known governor controls. To overcome the need for constant supervision and attendance, and to provide means for accelerating the engine to meet increased load conditions and hydraulic pump slippage, we make reference to Figures 2 and 3 wherein the installation generally referred to in Figure 1 is more specifically illustrated and wherein corresponding parts are given corresponding numerals.

In this installation, the feed line 15 leads to a T-shaped pipe valve 28 having a three-way port which may be operated by a control handle 29 to provide a connection with the pump through the ports 30, 31, 32 simultaneously to feed oil under hydraulic pressure for the motor 16, from the feed line 15 and to a line 33 feeding the oil or liquid to an hydraulic servo-motor 34, mechanically operating the push rod 35, and having a clevis 36 connected to the lever arm 37 pivoted on the pintle 38 on the engine block. The manual control of the valve 28 as shown may be used optionally to bypass the servo-motor 34 by a turn of 180° to the dotted position of the port 32. An arm 39 having a plurality of apertures 40 is coupled to the throttle valve link arm 41 on the carburetor valve 9 by the double ended hooked link 42, so that the hooked portion may engage any one of a series of drill holes 43 thereon. The servo-motor 34 is supported against movement on the engine block 10 by suitable brackets 44.

Specifically, the servo-motor 34 comprises a cylinder 45, having its end 46 formed with a boring 47 which is tapped for screw-threaded coupling with the line 33. The cylinder is formed with a primary boring 48 having a bevel mouth 49 at one end and a stop shoulder 50, defining a secondary boring 51. Into the borings 48 and 51 there is fed the plunger assembly 52 comprising a guide sleeve 53 fitting within the boring 51 and a head portion 54 fitting within the boring 48. The head portion 54 is formed with a rectangular annular groove 55 into which is fitted an O-ring 56 which may be seated in the groove when the head 54 is adjacent the bevel portion 49 previously described. The limits of movement of the sleeve 53 is between the bevel portion 49 and the shoulder 50, there being an extension 56' to abut the shoulder 50 within a predetermined travel of the sleeve 53 to provide a cushioned seal.

The guide sleeve 53 has an internal boring 57 within which the secondary plunger 58 may slide. The plunger 58 has a head 59, adjacent the neck of which there is provided an annular rectangular groove 60, into which is fitted an O-ring 61 to seal the plunger 58 within boring 57.

The head 54 optionally has an annular flange 62 outlining an aperture 63 adjacent the head 59. The flange 62 may be eliminated to provide the boring 57 continuous as shown by the dotted line 63' in which event the plungers may be of equal length. The sleeve 53 has its end 64 extended to be co-terminous with the end 65 of the primary cylinder 45 in the retracted position of the sleeve 43, as more specifically shown in Figure 4.

The secondary plunger 58 is formed with a screw-threaded boring 66 into which is screw-threadedly connected the push rod 35, after applying the spring loading disk 67 in abutment with the end 64 of the sleeve 53. The cylinder 45 is screw-threaded adjacent its end 68 to threadedly engage the spring enclosing cylinder 69 adjustably. A lock nut 70, engaging the cylinder edge 71, holds the cylinders 45 and 69 in adjusted position. The cylinder 69 has an end plate 72, suitably bored for slidably guiding the rod 35. A loading spring 73 engages the end plate 72 at one end thereof and abuts the disk 67 at the other end.

By the construction described, it will be evident that the plunger assembly 52 may move in unison against the spring loaded disk 67 for a distance until the shoulder 56' engages the shoulder 50. Relative movement of the secondary plunger 58, of greater magnitude, against the spring loaded disk 67 may be secured to permit the plunger to move, leaving the sleeve 58 stationary. The construction described is fitted in the assembly to respond to the hydraulic pressure in the line 15 leading to the hydraulic motor 16 whereby fluctuations in pressure in the pressure line 15 will exert their influence on the plunger assembly 52, that is on the head 54, and through the aperture 63 on the head 59.

The cylinders 45 and 69 may be adjusted relatively to each other to become spring loaded in accordance with some minimum idling speed of the engine 10, after adjusting the power take-off unit 12 for engagement to drive the pump 14, the minimum idling speed requirement thereby permitting a shifting of gears without clashing to place the power take-off unit into engagement. As the pump begins to operate and overcomes the load of the counter shaft 20, driving the loader and packer, the resistance and resultant pump slippage reflect themselves in an increase in oil pressure in the line 15 leading to the motor 16, as well as to the servo-motor 34.

The spring pressure of the loading spring 73 will determine whether any increase above idling speed will be effected by movement of the push rod 35 for actuating the throttle or carburetor valve.

In operation of the loader and packer exemplified, the handling of normal refuse with a gradual increase in the load on the motor 16 will result in an increase in revolution of the engine 10 as the pressure is built up in the line 15 to make up for pump slippage. Self-energizing pressure elevation in normal loading is restrained by the limiting movement of the primary plunger 53 and the positive engagement of the shoulders 50 and 56', thus positively restraining transmission of movement to the rod 35 for actuation of the throttle valve. An abnormal load, such as in depositing relatively infrangible material in the hopper 24, or when the truck body has been filled to the point where the blade packer 27 encounters the resistance of the load within the truck, an abnormal pressure may be built up in the pressure line 15, requiring oil volume for the pump 14 of relatively indeterminate character beyond the shoulder 50 of the primary plunger 52. Under these circumstances, the increased pressure head becomes effective through the aperture 63 on the head 59 of the secondary plunger 58, to cause movement of the plunger 58 as more clearly illustrated in Figure 6, against the loading spring 73 within the cylinder 69. Pressures up to the opening of the relief valve 74 may thereby be secured to speed up the rotation of the engine 10 from a normal speed of from 600 to 650 revolutions per minute to from 1000 to 1250 revolutions per minute.

By the construction described and illustrated, great stability in engine speeds is experienced and a predetermined carburetor setting for idling speeds may be economically effected. No attendance of the throttle is necessary under all conditions. Under normal loading the increase in load reflects itself in an increase in throttle opening to increase the engine speed, to compensate for hydropump slippage. Unnecessary self-energizing speed increases are avoided as the engine speed reaches a point where the plunger assembly 52 brings the plunger head to a position where the shoulders 50 and 56' are in engagement and the spring loading is of the magnitude to prevent any further gradual changes in position of the push rod 35. The transition from actuation of the combined plungers to the operation of the secondary plunger 58 occurs only upon abnormal increase in load or as a result of the effect of the intermittent packing resistance which the packer blade encounters with each stroke. The servo-motor connection between the pressure line and the engine 10 takes care of these abnormal conditions without stalling the engine 10. This serves to maintain an economical engine speed, with stability for idling and normal load conditions, distinguishing over servo-motors in the hydraulic line employed in vehicles in which torque conversion is effected between the engine and the traction wheels hydraulically. In the latter case a gradual variance in the load or deceleration of the movement of the vehicle which is encountered, is met by the driver who is in constant attendance.

By the installation herein provided, no attendance is required and a mode of operation of the engine is secured to procure immediate stabilization of the power to the load within normal limits, economically and under abnormal conditions to procure a very wide range of power or volume of oil for hydraulic power within the safety limits of the system.

It will be understood that while we have supplied specific examples of ranges of engine speeds for idling, normal loading, and abnormal loading conditions, with corresponding ranges of oil pressures, it will be understood that these examples are illustrative only and that with differently designed engines and loads that the specific figures may vary over a greater and different range, and accordingly the subject matter is to be construed in the light of the broader aspects of the invention which has been described.

In the claims, where we refer to an abrupt gradient factor in qualifying the relationship of pressure to power take-off displacement, we mean to include thereby the graphic effect of plotting pressure with relation to displacement.

Having thus described our invention and illustrated its use, what we claim as new and desire to secure by Letters Patent is:

1. In an engine driven truck and loader assembly therefor; a pump and motor hydraulic transmission wherein the pump is driven by an engine controlled by a throttle and the motor is actuated by pressure in a pressure line leading from the pump, the combination therewith of a servomotor in fluid communication with said pressure line and operably connected with said throttle by a mechanical connection, said servomotor having cylinder and piston means operably connected with said mechanical connection to provide initially a low pressure responsive range of actuation thereto and additional cylinder and piston means operably connected with said mechanical connection to provide an auxiliary high pressure range of actuation thereto, said ranges of actuation having an abrupt gradient factor therebetween.

2. In an engine driven truck and loader assembly therefor; a pump and motor hydraulic transmission wherein the pump is driven by an engine controlled by a throttle and the motor is actuated by pressure in a pressure line leading from the pump, the combination therewith of a servomotor in fluid communication with said pressure line and operably connected with said throttle by motion transmitting connecting means, said servomotor having cylinder and piston means operably connected with said connecting means to provide initially a low pressure responsive range of actuation thereto and additional cylinder and piston means operably connected with said connecting means to provide an auxiliary high pressure range of actuation thereto, said ranges of actuation having an abrupt gradient factor therebetween.

3. A servomotor adapted to be coupled with hydraulically effective pressure means for automatically and hydraulically throttling an engine comprising, in combination, connecting rod means and guide means therefor arranged to be connected with engine throttling means, under the influence of said hydraulic pressure means, for movement in one direction and spring loaded means for return movement of said connecting rod, a primary plunger cylinder adjustably connected with said guide means for said connecting rod means having a primary boring to which the said hydraulically effective pressure means may be directly connected for feed thereinto, a primary plunger slidably sealed in said primary plunger cylinder, said primary plunger comprising a secondary cylinder having a secondary plunger slidably sealed therein, a common loading disk for said plungers, said common loading disk being under the influence of said spring loaded means, the secondary cylinder having a limited low range pressure displacement relative to said primary cylinder, the secondary plunger having a high range pressure displacement relative to secondary cylinder and of greater magnitude than said secondary cylinder displacement, the secondary cylinder and secondary plunger being automatically responsive to the biasing action of the spring loading of said connecting rod during a drop in hydraulic pressure upon said secondary plunger and said secondary cylinder.

4. A servomotor for automatically throttling an engine comprising, in combination with a push rod for the throttle thereof, a loading spring enclosing cylinder through which the push rod is slidably guided at one end against the spring load of said cylinder, a loading spring and disk coupled to said rod within said cylinder, a plunger cylinder coupled to said first cylinder and having at its opposite end a primary boring directly accessible to hydraulically effective pressure means and having a plunger assembly consisting of a pair of plungers slidably sleeved within said second cylinder for actuating said disk, one of said pair of plungers being slidably nested within the other, said plungers being movable relative to each other and engaging said disk, the plunger cylinder having stop means for the outer plunger for limited transmission movement to said push rod, the inner plunger having a greater magnitude of displacement than the outer plunger, the plungers being automatically responsive to the biasing action of the spring loading of said connecting rod during a drop in hydraulic pressure upon said plungers.

5. A servo-motor for automatically hydraulically throttling an engine comprising, a cylinder, a first hydraulic piston slidably seated in said cylinder, said piston having an axial bore therethrough, a second hydraulic piston slidably seated in said bore, abutment means for limiting the stroke of said first piston in one direction to a fraction of the stroke of said second piston relative to said cylinder in response to hydraulic pressure, means responsive to displacements of said pistons for controlling the engine's throttle, a common loading disk for said pistons, means for loading said pistons in the direction opposite from that aforesaid through said disk, an hydraulic seal between said second piston and said first piston, and an hydraulic seal between said first piston and said cylinder located at the head of said first piston, the effective hydraulic pressure responsive area at the head of said first piston being large in relation to the effective hydraulic pressure responsive area at the head of said second piston, thereby providing an abrupt and large change in gradient factor in the response of the servomotor to hydraulic pressure.

References Cited in the file of this patent

UNITED STATES PATENTS

| | | |
|---|---|---|
| 834,825 | Logan | Oct. 30, 1906 |
| 1,259,090 | Ferris et al. | Mar. 12, 1918 |
| 1,981,805 | Kačer et al. | Nov. 20, 1934 |
| 2,196,511 | Wagner et al. | Apr. 9, 1940 |
| 2,326,821 | Boyle | Aug. 17, 1943 |
| 2,337,573 | Schultz | Dec. 28, 1943 |
| 2,369,397 | Kostenick | Feb. 13, 1945 |
| 2,496,192 | Baldt | Jan. 31, 1950 |
| 2,527,428 | Kemerer | Oct. 24, 1950 |

FOREIGN PATENTS

| | | |
|---|---|---|
| 545,445 | France | July 22, 1922 |